(12) United States Patent
Blondel et al.

(10) Patent No.: US 7,780,762 B2
(45) Date of Patent: Aug. 24, 2010

(54) CARTRIDGE FOR TREATING A GAS

(75) Inventors: Jean-Marie Blondel, Dombasle sur Meurthe (FR); Dominique Grandjean, Brussels (BE); Claude Dehennau, Waterloo (BE); Phillipe-Jacques Leng, Brussels (BE)

(73) Assignee: Solvay (Societe Anonyme), Brussels (BE)

( * ) Notice: Subject to any disclaimer, the term of this patent is extended or adjusted under 35 U.S.C. 154(b) by 252 days.

(21) Appl. No.: 12/065,805

(22) PCT Filed: Sep. 11, 2006

(86) PCT No.: PCT/EP2006/066204
§ 371 (c)(1),
(2), (4) Date: Mar. 5, 2008

(87) PCT Pub. No.: WO2007/031475
PCT Pub. Date: Mar. 22, 2007

(65) Prior Publication Data
US 2008/0236388 A1    Oct. 2, 2008

(30) Foreign Application Priority Data
Sep. 13, 2005    (FR) .................................. 05 09343

(51) Int. Cl.
*B01D 53/04* (2006.01)
*B01D 53/26* (2006.01)
(52) U.S. Cl. ................................ 95/90; 96/118; 96/154
(58) Field of Classification Search .................. 96/118, 96/147, 148, 154; 95/90, 91, 117; 264/571
See application file for complete search history.

(56) References Cited

U.S. PATENT DOCUMENTS

| | | | | |
|---|---|---|---|---|
| 2,038,071 A * | 4/1936 | Wilhelm | ...................... | 96/118 |
| 3,568,416 A * | 3/1971 | Staunton | ...................... | 96/133 |
| 3,727,384 A * | 4/1973 | Feldman | ...................... | 96/131 |
| 3,733,791 A * | 5/1973 | Dravnieks | ...................... | 261/2 |
| 3,956,458 A * | 5/1976 | Anderson | .................... | 423/210 |
| 4,917,862 A * | 4/1990 | Kraw et al. | .................... | 422/4 |
| 6,689,197 B2 * | 2/2004 | Dick et al. | .................... | 96/118 |
| 7,615,269 B2 * | 11/2009 | Payne et al. | ................ | 428/35.2 |

FOREIGN PATENT DOCUMENTS

FR    2819990 A1    8/2002

(Continued)

OTHER PUBLICATIONS

PCT International Preliminary Report on Patentability and Written Opinion dated Mar. 18, 2008 for corresponding International Patent Application No. PCT/EP2006/066204 (6 p.).

(Continued)

*Primary Examiner*—Frank M Lawrence
(74) *Attorney, Agent, or Firm*—Beatrice C. Ortego

(57) ABSTRACT

Cartridge for the treatment of a gas by reaction with a reactive substance, comprising a cohesive assembly of alveolate cells that are at least partly filled with the reactive substance, the alveolate cells possessing one part of their wall which is permeable to the gas and impermeable to the reactive substance, said wall part being intended to be in contact with the gas.

19 Claims, 2 Drawing Sheets

FOREIGN PATENT DOCUMENTS

| | | | |
|---|---|---|---|
| FR | 2843043 | A1 | 2/2004 |
| GB | 1505843 | | 3/1978 |
| GB | 2050194 | A | 1/1981 |
| GB | 2161093 | A | 1/1986 |
| JP | 2002250456 | A | 9/2002 |
| WO | WO 2005014257 | A2 | 2/2005 |

OTHER PUBLICATIONS

PCT International Search Report dated Mar. 11, 2006 for corresponding International Patent Application No. PCT/EP2006/066204 (2 p.).

Search Report from the Institut National De La Propriete Industrielle dated Jul. 5, 2006 for corresponding French Application FR2005/09343 published as FR2890576 (2 p.).

* cited by examiner

CARTRIDGE FOR TREATING A GAS

CROSS-REFERENCE TO RELATED APPLICATIONS

This application claims priority to International Application PCT/2006/066204, filed Sep. 11, 2006, which claims priority to French Application No. FR05.09343, filed Sep. 13, 2005, the entirety of each application being incorporated herein by reference,

TECHNICAL FIELD OF THE INVENTION

The invention relates to a cartridge for treating a gas. It also relates to its use and to a process for producing it.

More particularly, the invention relates to a cartridge in which the treatment of the gas is carried out by making the gas react with a substance contained in the cartridge. For example, the treatment is that of deodorizing air by reaction with an odour absorbent, such as sodium bicarbonate, of absorbing the $CO_2$ contained in a gas by contacting and reacting the latter with, for example, lime, or dehumidifying a gas, by making it react with a hygroscopic substance.

BACKGROUND OF THE INVENTION

In particular, dehumidification, in the home but more particularly in industry, represents a large and growing market. For example, it is estimated that the number of transported containers requiring the use of means for conditioning the transported products in terms of humidity is more than two hundred million per year.

A simple means of dehumidifying the air is to bring it into contact with a highly hygroscopic substance. Thus, it is known to use silica gel, clays, and magnesium or calcium chloride. In the case of calcium chloride, its conversion from anhydrous $CaCl_2$ to its hydrated forms involves an extremely large quantity of water being absorbed, it being possible for 1 kg of calcium chloride to absorb, at equilibrium, up to 14 kg of water. This product is also economically very useful. However, it has the drawback of becoming liquid after absorbing water, raising the problem of how to confine it. For this purpose, calcium chloride is commonly placed in open trays. This solution is unacceptable, whether in an industrial environment or for household use, because of the risk of spilling calcium chloride onto the materials being conditioned if the tray is upset. This is because, on the one hand, calcium chloride hexahydrate is very viscous and difficult to clean and, on the other hand, it is highly corrosive and may therefore damage the materials being conditioned.

FR 2 819 990, in the name of the Applicant, has proposed placing the calcium chloride in an envelope permeable to gases but impermeable to liquids, for example made of a polyethylene nonwoven. However, although this solution is effective for the packaging of fragile products, such as fruit and vegetables, it is completely unsuitable for the industrial transportation of products handled with less regard. This is because if the semi-permeable envelope were to be damaged during its use, its entire contents could escape therefrom and contaminate its environment. Moreover, since the envelope is not rigid, it is more difficult to handle it. Finally, in certain positions of the envelope, the hygroscopic substance collects into a compact mass having a decreased area of contact with the air. This reduces the effectiveness of the dehumidification.

It is also known to mix anhydrous calcium chloride or calcium chloride dehydrate with clay or with an inert absorbent substance (sawdust or wood chips) so as to absorb the liquid phase resulting from the dehumidification and to prevent liquid leaks. This mixture often limits the absorptivity of the desiccating mass.

SUMMARY OF THE INVENTION

In general, the object of the invention is to provide a means for treating a gas by reacting the gas with a substance that is simple and inexpensive, capable of being used easily in an industrial environment and which promotes a large contact area of the gas with the substance.

Consequently, the invention relates to a cartridge for the treatment of a gas by reaction with a reactive substance, comprising a cohesive assembly of closed alveolate cells that are at least partly filled with the reactive substance, the alveolate cells possessing one part of their wall which is permeable to the gas and impermeable to the reactive substance, said wall part being intended to be in contact with the gas.

BRIEF DESCRIPTION OF THE DRAWINGS

For a detailed description of the preferred embodiments of the invention, reference will now be made to accompanying drawings in which.

DESCRIPTION OF THE PREFERRED EMBODIMENTS

Figure 1:
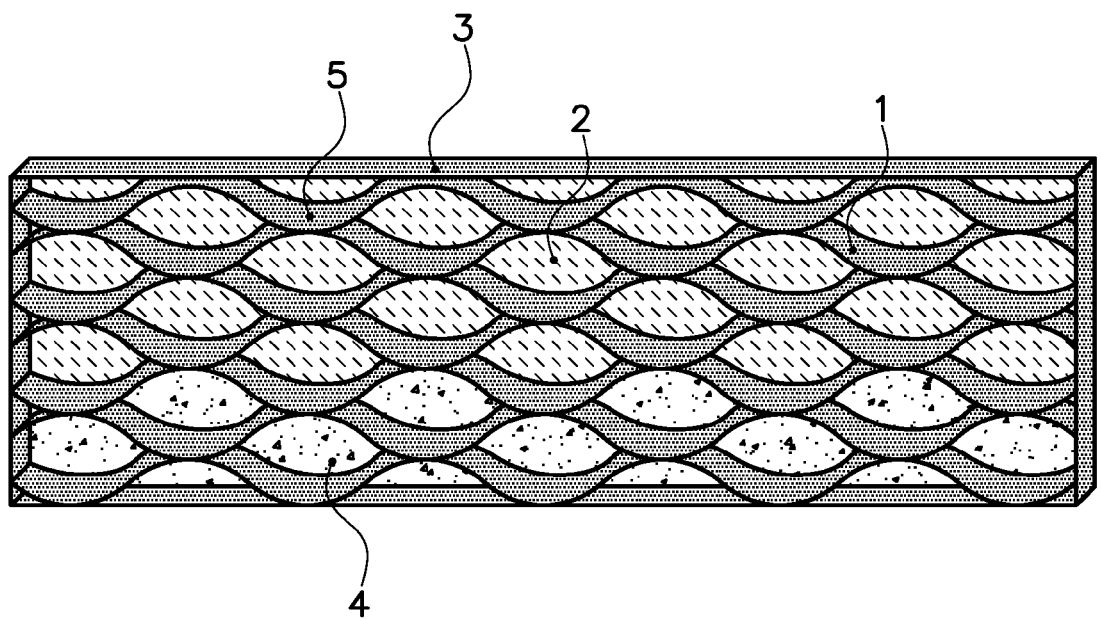
FIG. 1 shows a cartridge for humidity conditioning according to the present invention, in particular for transport containers.

The term "cartridge" is understood to mean a container having sufficient rigidity to possess, in the absence of stresses, a defined and reproducible shape. In particular, the rigidity must be sufficient to give the alveolate cells a defined and reproducible shape so as to make it easier to fill them with the gas-treating substance. The cartridge may have any shape suitable for its particular use, namely spherical or parallelepipedal, with plane or curved surfaces. In practice, it is advantageously parallelepipedal, as such a shape fits in with many uses and arrangements. It also allows several cartridges to be easily superposed. The dimensions of the cartridge depend in particular on the volume of gas to be dehumidified and on the available volume in which the cartridge has to be placed. Since the cartridge is particularly suitable for industrial uses, it has been observed that a parallelepipedal cartridge having external dimensions varying from 5 to 150 cm (preferably 10 to 50 cm) as width, 15 to 300 cm (preferably 30 to 75 cm) as length and 1 to 5 cm (preferably 1 to 3 cm) as thickness give a good compromise between handleability, rigidity and treatment effectiveness. A group of such cartridges, from 2 to 10 or preferably 3 to 5, may also be superposed in a compact manner in order to increase the treatment capacity. For this purpose, it is advantageous for the cartridges to possess means suitable for remaining slightly spaced apart when they are superposed, in order to improve the circulation of the gas to be treated between the cartridges and to increase the effective area of contact with the reactive substance.

According to the invention, the reactive substance is placed in a cohesive assembly of closed alveolate cells, more briefly called an alveolate structure. This substance is therefore not a single part in the cartridge but is divided into a plurality of independent subassemblies. Such a division has, on the one hand, the advantage that, if the wall of the cartridge is locally damaged, only a portion of the reactive substance can flow therefrom. On the other hand, the division increases the area of contact of the gas with the reactive substance, irrespective of the position of the cartridge, in particular in vertical positions. This division therefore makes it possible to draw the maximum reactive capability from the substance. The reactive substance is preferably introduced by itself into the alveoles. However, it may also be introduced as a mixture with other reactants, or even any other useful composition. Moreover, the cells form a cohesive unit, that is to say they are not mechanically isolated. Preferably, they are fastened to at least one neighbouring cell or to a common portion of the cartridge, in order to form a subassembly of a single mechanical part, so as to limit the risk of the cells becoming detached from the cartridge when it is damaged. The alveolate cells are closed in the sense that they have walls in all directions and the reactive substance that is placed therein cannot escape therefrom. The alveolate cells are advantageously contiguous, that is to say one part of their wall is in contact with that of the neighbouring cell. One part of their wall is even preferably common, the two faces of any one wall belonging to two different adjacent cells. The alveolate cells must not be too large, in order to obtain good division of the reactive substance, nor too small, in order not to lose too large a volume in the walls and to be able to easily introduce the reactive substance into the cells. In practice, it is recommended that the largest internal dimension of the alveoles be between 5 and 50 mm, preferably between 10 and 30 mm. The smallest dimension must not be less than a few millimetres. Advantageously, it is between 3 and 20 mm.

Figure 2:
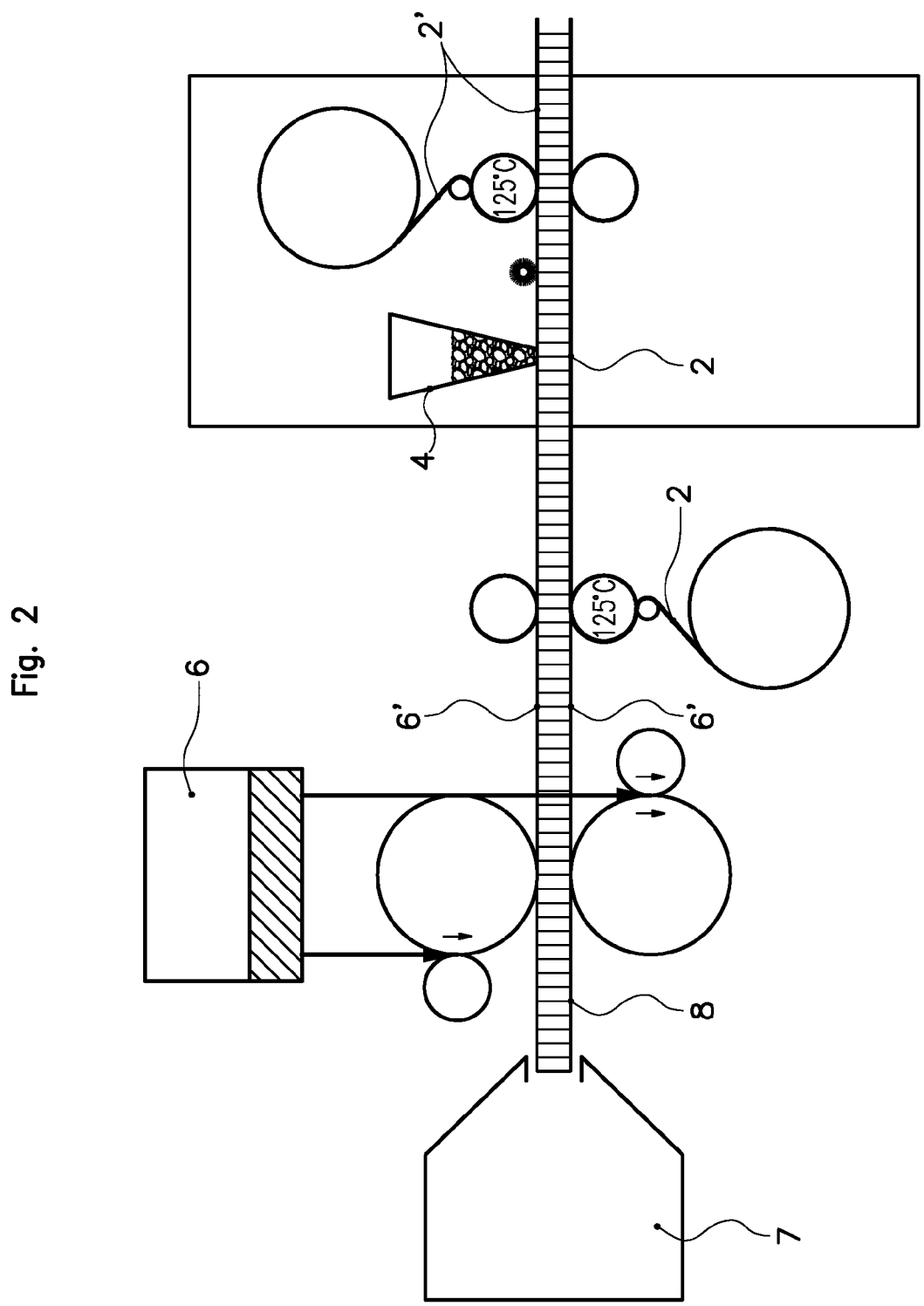
FIG. 2 shows a process for manufacturing a cartridge according to the present invention.

In the cartridge according to the invention, it is essential for the alveolate cells to possess a "semi-permeable" part of their wall, that is to say one that is permeable to the gas and impermeable to the reactive substance. More precisely, on the one hand, this wall part must be permeable to the gas to be treated, so that it can penetrate into the alveole and be in contact with the reactive substance. On the other hand, it must effectively contain, of course, the reactive substance, but also preferably the products of the reaction, in particular when these products are unpleasant for the environment of the cartridge. The semi-permeable wall is therefore also impermeable to the products of the reaction. The term "reaction" is understood to mean all the chemical or physical phenomena that may take place between the gas and the reactive substance. Thus, for example, when the treatment is a dehumidification with calcium chloride as reactive substance, the semi-permeable wall is advantageously substantially impermeable to the liquids that are liable to form in the cell as a result of the absorption of the moisture in the gas, so that they cannot spill out of the cartridge. The semi-permeable walls are therefore advantageously impermeable to aqueous solutions. All of the walls may be made of the same material and be overall semi-permeable. However, in practice the cartridge will therefore not easily have the correct rigidity. It is more advantageous for the cartridge to comprise different materials for the semi-permeable wall parts and for the rest of the walls, which are impermeable and give the rigidity. The semi-permeable material must adhere well to the other constituent material or materials of the cells, so as to obtain closed cells. In so far as it is in general difficult to obtain good adhesion of the semi-permeable material directly to the rest of the walls of the cells, in an advantageous variant of the cartridge according to the invention the walls of the alveolate cells comprise at least two parts based on different materials. In this variant, the second material, advantageously placed on at least one of the faces of the cartridge, has the effect of promoting adhesion, for example by bonding or welding the semi-permeable part to the alveolate structure. It is therefore necessary to select, as second material, an adhesive which serves as intermediary and possesses good adhesion to both materials. This variant is particularly recommended when the semi-permeable material has to adhere to a small area, for example to the section (thickness) of the rest of the wall, as illustrated in FIGS. 1 and 2.

To produce the semi-permeable wall parts, various materials may be used depending on the nature of the reactive substance and the products of the reaction. In the simple case of a reactive substance in the pulverulent solid state which does not give liquid reaction products, a low-density nonwoven or a simple fabric whose mesh or porosity is sufficiently tight to contain the finest particles of the reactive powder may be suitable. If the reactive substance produces reaction products that are in the liquid state, it is recommended to use "breathing" microfabrics, for example of the type of the products sold under the brand GORE—TEX® or microfibre-based nonwovens, such as those sold under the brand name TYVEK®, or based on polyethylene microfibres, or any other type of permselective membrane. The gas permeability is then advantageously at least 100 ml/min, measured according to the ISO 5636/3 standard (1.5 kPa pressure difference; 10 $cm^2$ specimen area). The impermeability is preferably such that the results in the Suler test (AATCC 127, DIN EN 20534, 60 cm/min fill speed) are equal to at least 50 cm. This test measures the maximum height of liquid column that can be applied to one face of a flat specimen before the first drop of liquid appears on the other face.

In the cartridge according to the invention, the semi-permeable film is preferably placed on an open alveolate cell part, with no wall, the wall being formed by the film segment. The film segment may be fastened to the edge of the opening, for example by welding or bonding or by mechanical means. However, in an advantageous variant of the cartridge according to the invention, the alveolate cells possess an open wall part, the cohesive assembly being placed in a closed envelope made of semi-permeable material, so as to cover the open wall parts. In this variant, it is essential for the external dimensions of the cohesive assembly of cells and for the internal dimensions of the envelope to coincide, so as to obtain sufficient clamping of the envelope to the open wall parts and therefore to obtain good sealing. It is therefore unnecessary to fasten the envelope to the alveolate structure. When the reactive substance is placed in the alveolate structure, the latter is for example deposited on a thin temporary support, which is removed after introduction into the envelope.

To ensure that there is sufficient contact area between the gas to be dehumidified and the hygroscopic substance, the wall part permeable to the gas and impermeable to the reactive substance must be sufficient. It is recommended that this part be at least 20%, preferably 30% and more preferably at least 50% of the wall of each alveole. Moreover, when the cartridge is parallelepipedal, this part is equal to at least 50%, advantageously 75% and more preferably 100% of the area of one of the large faces of the cartridge, excluding the surface part occupied by the section of the rest of the walls, so as to maximize the area for exchange with the gas. The rest of the wall of the cells may be made of any material possessing the necessary mechanical and chemical properties. Metal, plastic or even cardboard may for example be used successfully.

In one advantageous embodiment of the cartridge according to the invention, at least one part of the wall of the alveolate cells is made of a rigid plastic. The tensile modulus of the plastic is preferably at least 500 MPa. Polycarbonate, polyamides, polycaprolactone, fluoropolymers, polyethylene, polypropylene and polyvinyl chloride (PVC) have for example given excellent results, depending on the treatment, the gas and the chemical nature of the reactive substance. Polyethylene, polypropylene and polyvinyl chloride (PVC) are preferred. It is also advantageous to use foamed plastics, in particular foamed polyethylene, as described in application WO 2005/041257, the content of which is incorporated for reference in the present description.

The cartridge according to the invention possesses excellent strength when being rapidly handled and improved effectiveness thanks to the large area of contact between the gas and the reactive substance. Preferably, it includes no mechanical device involving the movement of parts, such as a motor or a fan. Thanks to the division of the reactive substance provided by the alveolate structure, the cartridge according to the invention can be placed in any position. In particular, it can be easily suspended or bonded, in the manner of a frame, to a wall, its shorter side being perpendicular to the wall. It may be equipped with a specific support designed to keep it vertical, or it may be inserted into an apparatus accommodating several cartridges placed in parallel. These qualities, combined with its ease of use and its low cost, make the cartridge according to the invention especially useful for dehydrating large volumes of air, for example for air-conditioning installations, by passing the air through an apparatus consisting of large cartridges placed in parallel, and more particularly for dehydrating closed spaces (such as cabinets, drawers, packages or domestic or industrial refrigerators) or closed premises (such as confinement rooms, cellars, humid rooms, boats or caravans).

The cartridge is particularly suitable for the industrial transportation of substances requiring a controlled atmosphere.

The invention therefore also relates to the use of a cartridge according to the invention for the conditioning of transport containers. The term "container" is understood to mean an enclosure of large dimensions, having a volume of greater than 10 $m^3$, typically greater than 60 $m^3$. The containers may be intended for road, sea or rail transport.

The cartridge according to the invention allows any type of gas to be treated, such as water vapour, carbon dioxide, acid combustion gases (HCl, HF, $SO_2$, $H_2S$, $NO_x$), gases resulting from the maturing of fruit and vegetables (ethylene, water vapour, carbon dioxide), smelly gases resulting from the fermentation of cheeses, from maturing of fruit and vegetables, from human activities (kitchens, toilets etc.).

Consequently, the invention also relates to a method of treating a gas, in which the gas is brought into contact with a cartridge according to the invention.

In a first variant of this method according to the invention, the treatment is a deodorization of the gas resulting from a biological or industrial activity or from chemical reactions, particularly air, the reactive substance is a perfumed or deodorizing substance such as sodium bicarbonate, activated charcoal, molecular sieves, such as zeolites, seaweed, sugar, paper fibres, plant fibres, finely divided silicas, etc. Sodium bicarbonate, in particular sodium bicarbonate with a particle size such that at least 90% of the particles have a diameter of less than 500 µm, preferably 130 µm, is recommended.

In a second advantageous embodiment of the method according to the invention, the treatment consists in reducing the $CO_2$ content of the treated gas and the reactive substance is caustic soda, caustic potash or, advantageously, lime.

In a third advantageous embodiment, the treatment consists in reducing the ethylene content of a maturing gas emitted by plant-derived products, such as fruit and vegetables, and the reactive substance is a solid oxidizing agent, such as potassium permanganate, sodium percarbonate, calcium peroxide, magnesium peroxide, sodium persulphate, a ferrate, etc. Potassium permanganate is preferred. This variant of the method is recommended for controlling the maturing of fruit and vegetables.

Finally, in a fourth variant, which is particularly advantageous, the treatment is a dehumidification and the reactive substance is a hygroscopic substance. In this variant, the hygroscopic substance is preferably selected from silica gel, molecular sieves, such as zeolites, clays, such as sepiolite or bentonite, caustic soda, caustic potash, magnesium chloride and calcium chloride, the latter being particularly preferred. The conversion of anhydrous $CaCl_2$ to $CaCl_2.6H_2O$ involves an absorption of water approaching about 97% of its initial weight and its conversion from $CaCl_2.2H_2O$ to $CaCl_2.6H_2O$ involves an absorption of water approaching about 50% of its initial weight. However, $CaCl_2.6H_2O$ is a liquid which has not reached its maximum desiccation effectiveness, the solution itself being highly hygroscopic. This is because any hydrated formulation of calcium chloride, even liquid, is capable of having a hygroscopic capability until it reaches its equilibrium composition, that is to say in equilibrium with the ambient atmosphere. Under certain conditions (25° C.; 95% relative humidity), 1 kg of calcium chloride can thus absorb, at equilibrium, up to 14 kg of water. Thanks to the division, according to the invention, of the reactive substance, which increases its area of contact with the gas, this variant of the method makes it possible to draw the maximum desiccating capacity from the calcium chloride. Moreover, the effectiveness of this variant of the method is most particularly noteworthy when the air has a very high humidity (before dehumidification), the use of the cartridge making it possible to maintain the relative humidity of the enclosure below 99% and therefore to avoid any condensation. This variant is particularly suitable for dehumidifying transport containers.

Certain variants may, where appropriate, be combined, by introducing a mixture of reactants or a reactant possessing several functions into the alveolate structure.

Finally, the invention also relates to a process for manufacturing a cartridge according to the invention, in which:
  parallel plastic sheets are continuously extruded into a cooling chamber having compartments located on each side of the sheets;
  each compartment is subjected, alternately, to an injection of pressurized cooling fluid and to a vacuum, the two compartments located on the two sides of any one sheet being, in the case of one of them, exposed to the action of the pressurized fluid and, in the case of the other, to the action of the vacuum, and conversely during the next alternation, so as to deform the sheets and weld them together in pairs, in order to form a cohesive assembly of contiguous alveolate cells each possessing two open opposed wall parts;
  a reactive substance is placed in the alveolate cells; and
  the open wall parts of the cells are closed off by a film permeable to the gas and impermeable to the reactive substance.

According to this process, the alveolate structure is produced continuously by means of an extrusion die. It is therefore possible to obtain alveolate structures of very large dimensions. The pressurization and depressurization of the regions located on either side of each strip ensures, on the one hand, that the alveoles are formed and, on the other hand, that they are welded together, the fluid introduced between two strips acting as a cooling fluid, the temperature of which is controlled. This makes it possible, after application of one strip against the neighbouring strip, to fasten them together by welding.

It is possible to vary the shape of the alveoles, which may be in the form of regular or irregular polygons or may be of elliptical, circular or oval shape, using the same die, even during operation, by modifying various parameters, such as the extrusion speed or the pressure and vacuum levels applied successively between two neighbouring strips.

When the reactive substance is placed in the alveolate structure, the latter is for example deposited on a thin temporary support, until the open parts of the cells are closed off.

In a recommended variant of the manufacturing process, a fraction of the open wall parts of the cells, for example that located on one of the faces of the cartridge, is closed off, preferably by a film, before a reactive substance is placed in the alveolate cells so as to facilitate filling. This film is advantageously rigid (having a tensile modulus of preferably at least 500 MPa) and impermeable. For example, in the case of a parallelepipedal cartridge, one of the two large faces is covered with a rigid film before filling, the other face being covered with a semi-permeable material after filling.

Details relating to a device for implementing the process according to the invention may be found in Application WO 2005/014257.

The cartridge according to the invention preferably complies with the cartridges obtained by the process according to the invention.

The figures described below serve to illustrate the invention.

FIG. 1 shows a cartridge according to the invention for humidity conditioning, in particular for transport containers, the cartridge comprising a cohesive assembly of alveolate cells formed by the periodic welding (5) of strips (1). The assembly is surrounded by a frame (3) and with a semi-permeable film (2) covering the large rear lateral face. Calcium chloride pellets or granules or dust or flakes (4) are placed in the alveoles. The film, similar to the film (2), covering the front large lateral face and closing off the cells, has not been shown.

FIG. 2 shows a process for manufacturing a cartridge according to the invention. Shown in the figure is an extrusion die (7) producing an alveolate structure (8). An adhesive (6), (6') is deposited on the bottom and top faces of the alveolate structure. Polyethylene films (2) and (2'), at least one of which is semi-permeable, are applied to the adhesive at a temperature close to 125° C. Calcium chloride (4) is placed in the cells between the applications of the films (2) and (2'). As a variant, the adhesives (6) and (6') could be coextruded rather than applied by the rolls shown. The adhesive (6) deposited on the top face could also be deposited after the calcium chloride has been placed in the cells.

The following example serves to illustrate the invention.

An assembly of seven rigid PVC strips (1) is extruded by means of a die provided with seven slots, each strip being 1 cm in width and about 100 μm in thickness. The strips are cooled, deformed and welded together periodically by passing them through a chamber provided with compression means and vacuum means, as described in WO 2005/014257. The continuous extrudate has been cut into six alveolate structures each having the dimensions 20×4×1.1 cm and each having two open faces measuring 20×4 cm. The alveolate cells were filled with flakes of technical-grade calcium chloride dehydrate screened to 3 mm, in an amount of 10 g per 100 cm of alveolate structure.

The six structures were affixed via their 20×1.1 cm faces and placed in an envelope made of TYVEK® polyethylene with a density of 50 g/m² and dimensions of 25×27 cm.

The cartridge thus formed was then placed for 96 hours in an environmental chamber at 90% humidity and a temperature of 25° C. Its weight was measured after 1 h, 2 h, 4 h, 8 h, 24 h, 48 h, 73 h and 96 h and a weight uptake deduced therefrom. The weight uptake results, expressed as a percentage of $CaCl_2.2H_2O$, are given in the following table:

| Time (hours) | Water absorption in wt % |
| --- | --- |
| 0 | 0 |
| 1 | 5 |
| 2 | 9 |
| 4 | 14 |
| 8 | 24 |
| 24 | 83 |
| 48 | 150 |
| 73 | 192 |
| 96 | 219 |

It should be noted that, during the conditioning, no leakage of desiccating liquid was observed on the external wall of the envelope. The results illustrate the excellent dehumidifying capability of the cartridge according to the invention.

The invention claimed is:

1. A cartridge for the treatment of a gas by reaction with a reactive substance, comprising a cohesive assembly of closed alveolate cells that are partly filled with the reactive substance, the alveolate cells possessing one part of their wall which is permeable to the gas, impermeable to liquids, and impermeable to the reactive substance and to the products of the reaction, said wall part being intended to be in contact with the gas.

2. The cartridge according to claim 1, wherein the treatment is a deodorization and wherein the reactive substance adsorbs the odours.

3. The cartridge according to claim 1, wherein the reactive substance is hygroscopic.

4. The cartridge according to claim 3, wherein the hygroscopic substance is calcium chloride.

5. The cartridge according to claim 1, wherein the wall part permeable to the gas and impermeable to the reactive substance is made of polyethylene fibers.

6. The cartridge according to claim 1, wherein the gas is air.

7. The cartridge according to claim 1, wherein the alveolate cells further include a part of their wall made of a rigid plastic.

8. The cartridge according to claim 7, wherein the plastic is selected from the group consisting of polyethylene, polypropylene, and polyvinyl chloride.

9. The cartridge according to claim 1, wherein the alveolate cells possess an open wall part, the cohesive assembly being placed in a closed envelope made of a material permeable to the gas and impermeable to the reactive substance, so as to cover the open wall parts.

10. The cartridge according to claim 1, wherein the walls of the alveolate cells comprise at least two parts based on different materials.

11. A method of treating the air contained in transport containers, wherein the air is brought into contact with the cartridge according to claim 1.

12. A method of treating a gas, wherein the gas is brought into contact with the cartridge according to claim 1.

13. A process for manufacturing a cartridge suitable for the treatment of a gas by reaction with a reactive substance said cartridge comprising a cohesive assembly of closed alveolate cells that are at least partly filled with the reactive substance, the alveolate cells possessing one part of their wall which is permeable to the gas and impermeable to the reactive substance and to the products of the reaction, said wall part being intended to be in contact with the gas, said process comprising the following steps:

continuously extruding parallel plastic sheets into a cooling chamber having compartments located on each side of the sheets;

subjecting each compartment, alternately, to an injection of pressurized cooling fluid and to a vacuum, the two compartments located on the two sides of any one sheet being, in the case of one of them, exposed to the action of the pressurized fluid and, in the case of the other, to the action of the vacuum, and conversely during the next alternation, so as to deform the sheets and weld them together in pairs, in order to form a cohesive assembly of contiguous alveolate cells each possessing two open opposed wall parts;

placing the reactive substance in the alveolate cells; and closing off the open wall parts of the cells by a film permeable to the gas and impermeable to the reactive substance.

14. The process according to claim 13, wherein a fraction of the open wall parts of the cells, which is located on one face of the cartridge, is closed off before the reactive substance is placed in the alveolate cells.

15. The cartridge according to claim 1, wherein the largest internal dimension of the alveolate cells is between 5 and 50 mm, and the smallest dimension of the alveolate cells is between 3 and 20 mm.

16. The cartridge according to claim 7, wherein the rigid plastic is selected from the group consisting of polycarbonate, polyamides, polycaprolactone, fluoropolymers, polyethylene, polypropylene, and polyvinyl chloride.

17. The cartridge according to claim 7, wherein the rigid plastic is a foamed plastic.

18. A method of treating a gas, wherein the gas is brought into contact with a group of the cartridges according to claim 1, said cartridges being superimposed and slightly spaced apart in order to improve the circulation of the gas to be treated between the cartridges and to increase the effective area of contact with the reactive substance.

19. A cartridge for the treatment of a gas by reaction with a hygroscopic reactive substance, comprising a cohesive assembly of closed alveolate cells that are partly filled with the hygroscopic reactive substance, the alveolate cells possessing one part of their wall which is permeable to the gas, impermeable to liquids, and impermeable to the reactive substance, said wall part being intended to be in contact with the gas, and wherein the alveolate cells further include a part of their wall made of a rigid plastic.

* * * * *